United States Patent
Kline

(10) Patent No.: US 7,302,477 B2
(45) Date of Patent: Nov. 27, 2007

(54) ADMINISTRATION TOOL FOR GATHERING INFORMATION ABOUT SYSTEMS AND APPLICATIONS INCLUDING THE FEATURE OF HIGH AVAILABILITY

(75) Inventor: Christopher Norman Kline, Firestone, CO (US)

(73) Assignee: International Business Machines Corporation, Armonk, NY (US)

(*) Notice: Subject to any disclaimer, the term of this patent is extended or adjusted under 35 U.S.C. 154(b) by 1023 days.

(21) Appl. No.: 10/632,621

(22) Filed: Jul. 31, 2003

(65) Prior Publication Data

US 2005/0027842 A1 Feb. 3, 2005

(51) Int. Cl.
*G06F 15/173* (2006.01)
*G06F 15/16* (2006.01)
*G06F 7/00* (2006.01)
*G06F 11/00* (2006.01)

(52) U.S. Cl. ...................... 709/223; 709/201; 709/220; 707/4; 714/4; 714/50

(58) Field of Classification Search ...................... None
See application file for complete search history.

(56) References Cited

U.S. PATENT DOCUMENTS

| | | | |
|---|---|---|---|
| 6,334,178 B1 | 12/2001 | Cannon et al. ............... 712/28 |
| 6,594,786 B1 * | 7/2003 | Connelly et al. .............. 714/50 |
| 7,020,677 B1 * | 3/2006 | Baillif et al. ................ 709/201 |
| 2002/0001307 A1 | 1/2002 | Nguyen et al. ............. 370/386 |
| 2002/0035625 A1 * | 3/2002 | Tanaka ........................ 709/223 |
| 2002/0116461 A1 | 8/2002 | Diacakis et al. ............ 709/204 |
| 2003/0004874 A1 | 1/2003 | Ludwig et al. ............... 705/40 |
| 2003/0041057 A1 * | 2/2003 | Hepner et al. .................. 707/4 |
| 2003/0069953 A1 * | 4/2003 | Bottom et al. .............. 709/223 |
| 2004/0153708 A1 * | 8/2004 | Joshi et al. ..................... 714/4 |
| 2004/0267910 A1 * | 12/2004 | Treppa et al. ................ 709/220 |

FOREIGN PATENT DOCUMENTS

EP 1310887 A1 7/2001

* cited by examiner

*Primary Examiner*—Wen-Tai Lin
(74) *Attorney, Agent, or Firm*—Arthur J. Samodovitz

(57) ABSTRACT

A method and program product for gathering information about a system. A user logs on to the system, and in response, computer programming automatically identifies application instances executing in the system, determines whether the system is configured for high availability, determines whether each of the identified application instances is configured for high availability, determines if the system is a node of a cluster of systems, and compiles and displays a unified report of the resulting information. The foregoing type of information is automatically compiled and displayed for other systems as well, in different respective sessions.

11 Claims, 7 Drawing Sheets

FIG. 7

DISPLAY SCREEN INFORMATION WINDOW:

EXECUTING MQTOOLS STANDARD PROFILE (V1.0.5)

| QUEUE MANAGER | STATUS | MAIN PID | UPTIME (DD-HH:MM:SS) |
|---|---|---|---|
| D03MQ101 | UP | 21944 | 62-21:10:19 |
| D03MQ102 | DOWN | | |
| ALL QMGRS: | NOT RUNNING | | |

MQSERIES MESSAGE BROKER FOR QUEUE MANAGER D03MQ101 RUNNING.

HIGH AVAILABILITY CLUSTER: THIS SERVER APPEARS TO BE CONFIGURED FOR HIGH AVAILABILITY CLUSTERS. MQSERIES CONFIG CHANGES (NOT DATA CHANGES) NEED TO BE PROPAGATED TO BOTH THE PRIMARY AND BACKUP NODES.

HOSTNAMES ASSOCIATED WITH THIS NODE:

D03MQ101
D03HA101B1_STBY
B305U22

COMPLEX: THIS SERVER APPEARS TO BE IN A SUPER PARALLEL COMPLEX, AND HOME DIRECTORIES, IDS, AND PASSWORDS, ARE SHARED ACROSS ALL SERVERS IN THE COMPLEX. THE CONTROL WORKSTATION IS <SACWSB>.

THIS IS THE GWA BLUE ZONE COMPLEX; THIS IS A PRODUCTION SERVER.

ADMINISTRATION TOOL FOR GATHERING INFORMATION ABOUT SYSTEMS AND APPLICATIONS INCLUDING THE FEATURE OF HIGH AVAILABILITY

The invention relates generally to computer systems, and deals more particularly with a software tool used to gather system information for systems administration.

Systems and applications administrators perform various tasks for computer systems (typically, servers) such as troubleshooting a loss of a connection between two servers, exhaustion of disk space, stoppage of an application, misrouting of application messages, authorization problems, and other application configuration issues. To perform each of these tasks, the systems or application administrator needs and has obtained system configuration and other system information such as hostname(s), network address (es), the identity of applications and their instances that are currently executing, the identity of message brokers that are currently executing, whether the system and its applications are configured for high availability, whether the system has a Super Parallel complex configuration and the names of the system in the complex of which it is a member. A Super Parallel complex configuration has multiple servers/nodes in a complex where the nodes execute serial, symmetric multiprocessor workloads and parallel workloads, and have distributed memory. All the servers are managed from a central multi-server management console. (In the case of high availability, certain types of changes manually initiated by the systems administrator to one server are not automatically made to other related servers, and therefore, the systems administrator must manually initiate them to the other related servers. In the case of super parallel complex configuration, certain types of changes made by the systems administrator are automatically propagated to other servers, which may not necessarily be desired.) The systems or applications administrators obtained the foregoing information as needed to solve current problems.

To gather the information as to the identity of the applications and their instances currently executing, the systems or application administrator performed the following steps: a) extracting configured instance names and primary data locations from an application-specific master configuration file; b) quering the operating system to see which of the application instances is running; and c) querying the running application instances to verify each is responsive and not hung. To gather the information as to the identity of the message brokers that are currently executing, the systems administrator performed the following steps: a) verifying whether the optional message broker is installed for the application; b) if installed, verifying whether the message broker is configured to run with any of the installed application instances (via an operating system query); c) if configured, querying the operating system to see if any configured message brokers are currently executing (running). To gather the information as to whether the system and its applications are configuration for high availability ("HA"), the systems administrator performed the following steps: a) querying the operating system for HA software installation; and b) if HA software is found, querying the application to determine whether any of its instances have been setup to use the HA software. To gather the information as to whether the system has a super parallel complex configuration, the systems administrator performed the following steps: a) querying the operating system for certain files and settings that indicate the presence of configuration files that propogate from a master control workstation; b) if found, verifying whether user accounts and passwords synchronize from the control workstation or are managed locally; c) extracting from the operating system configuration files the name of the control workstation that configuration files synchronize from. To gather the information as to the alias hostnames of the system, particularly when it is a member of a complex, the systems administrator performed the following steps: a) querying network address settings for the server for all addresses bound to this node; and b) using the addresses found to query the "host" file for all hostnames (aliases) that may be associated with this/these address(es) and thus with this node. It is time consuming for the systems administrator to obtain all this information, and prone to human error.

To compound the problem, one systems administrator is often required to manage multiple systems. To efficiently manage multiple systems, it is often necessary for the systems administrator to concurrently open and switch between several terminal sessions, one for each system being managed. For each session, there is a different set of system information needed to perform the system administration tasks. So, the effort to obtain the system information is compounded by the number of systems being managed. Also, with so many sessions open concurrently, the need to frequently switch between the sessions, and the dispersed nature of the obtained system information pertaining to each session, the systems administrator is prone to confuse which system information pertains to which terminal session.

Accordingly, an object of the present invention is to facilitate the job of a systems or application administrator in managing a single system.

Another object of the present invention is to facilitate the job of a systems or application administrator in concurrently managing multiple systems.

SUMMARY OF THE INVENTION

The invention resides in a method and program product for gathering information about a system. A user logs on to the system, and in response, computer programming automatically:
  identifies application instances executing in the system;
  determines whether the system is configured for high availability;
  determines whether each of the identified application instances is configured for high availability;
  determines if the system is a node of a cluster of systems; and
  compiles and displays a unified report of the resulting information.

According to one feature of the invention, the foregoing type of information is automatically compiled and displayed for other systems as well, in different respective sessions. Thus, the user logs on to a second system in a second session, and in response, second computer programming automatically:
  identifies application instances executing in the second system;
  determines whether the second system is configured for high availability;
  determinines whether each of the identified application instances in the second system is configured for high availability;
  determinines if the second system is a node of a cluster of systems; and
  compiles and displays a second, unified report of the resulting information.

BRIEF DESCRIPTION OF THE FIGURES

FIG. 7 is an image of a display screen generated by the tool of FIG. 2.

DETAILED DESCRIPTION OF THE PREFERRED EMBODIMENTS

Figure 1:
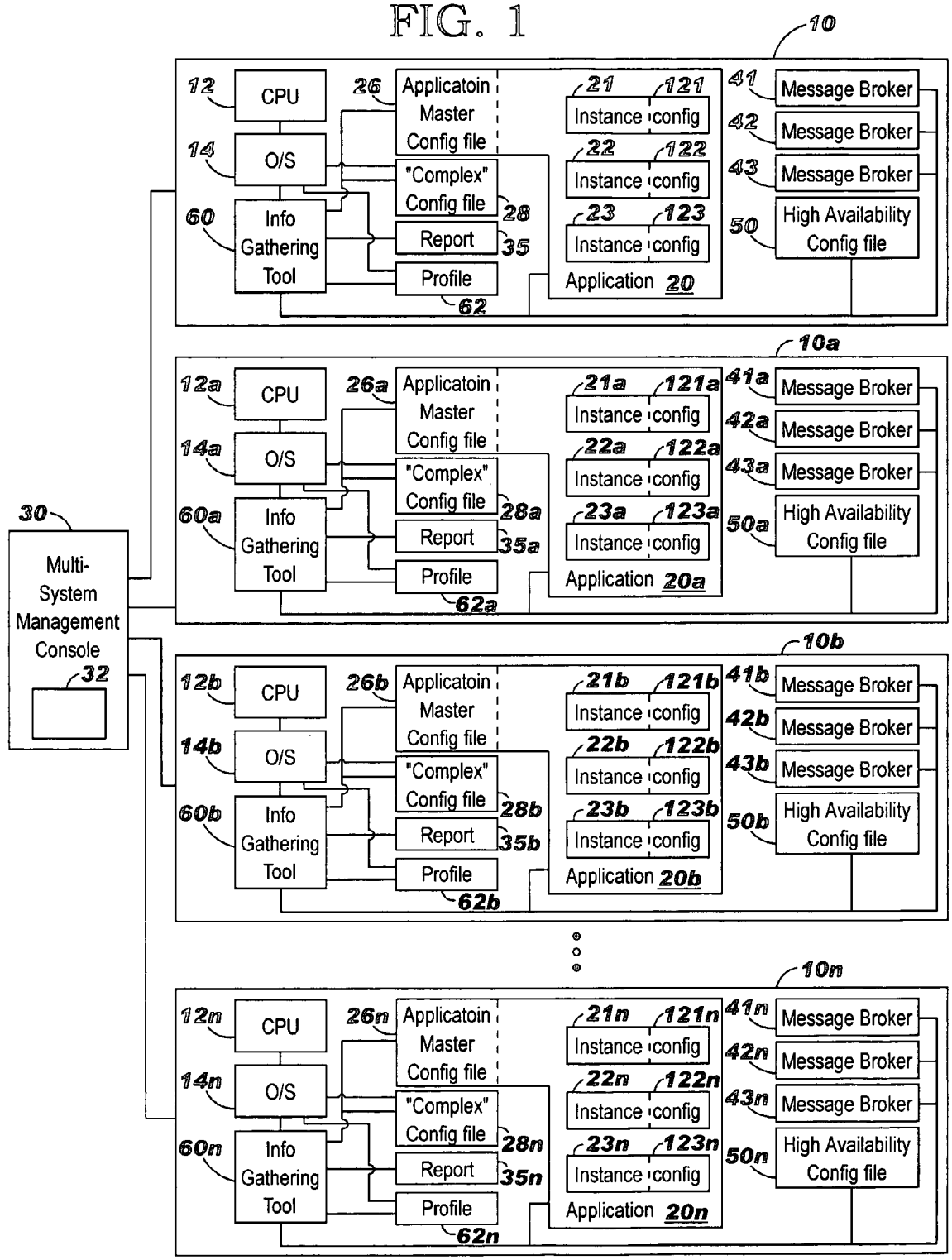
FIG. 1 is a block diagram of computer systems which embody the present invention.

Referring now to the drawings in detail wherein like reference numbers indicate like elements throughout, FIG. 1 illustrates a computer system generally designated 10 according to one embodiment of the present invention. Computer system 10 comprises system hardware including a CPU 12 and system software including an operating system 14. By way of example, the operating system can be UNIX, Linux, or Microsoft Windows. An application 20 is installed in system 10. By way of example, application 20 can be IBM WebSphereMQ middleware application which facilitates the exchange of messages between different applications having the same or different formats and protocols. Alternately, application 20 can be any of a wide range of applications such as data base management, transaction manager, enterprise application integration, web content manager, etc. In the illustrated embodiment, there are multiple instances 21, 22 and 23 of application 20, where each "instance" can have a different configuration and is identified by a different name/number. (An instance of IBM WebSphere MQ application is called a "Queue Manager".) Each instance can run concurrently on operating system 14. Computer system 10 includes an application-specific master configuration file 26 which contains the following information: names of application instances, the default settings for each application instance (i.e. default log threshold settings, file system locations, directories, name prefixes, default communication parameters etc.). Computer system 10 also includes application instance-specific configuration files 121, 122 and 123 for respective application instances 21, 22 and 23, which contains the following information for each instance: locations of logs and data directories, authorization settings, communications settings, channel limits, and other instance-wide configuration settings. The information in files 121, 122 and 123 can be read from corresponding files in external storage (not shown) for high availability. Computer system 10 also includes a set of message broker programs 40, one per application instance. Each message broker receives a publication of an event, and notifies its subscribers of the event. For example, the occurrence of an e-mail or other type of message can be considered an event, and there can be a "list serve" of subscribers which want to receive notification of this e-mail or other type of message. A message broker detects the occurrence of the message, and then configured subscribers retrieve the message(s) and distribute them to various (perhaps distributed) applications. The foregoing hardware and software components of system 10 are known in the prior art, and their types are not critical to the present invention.

In accordance with the present invention, system 10 also includes a systems administration information-gathering program tool 60 and an associated profile 62. The systems administrator creates profile 62 before use of tool 60, during a profile initialization session, although preferably there are required and default parameters for the profile 62. The following is an example of the contents of profile 62:

Profile Entries:

Command to run tool 60 immediately after log on to the system.

Listing of previously executed commands that can be invoked with a shorter string of characters.

Configuration of back space key.

Terminal emulation type.

Path settings for folders and directories which are searched when a command is entered.

Notification of local mail on the system, if any.

Notification of the "project environment" type, such as "Project X, Development and Testing" or "Project Y, Production".

Command aliases.

Any additional customized commands for a single node or environment, if any.

Operating system 14 is programmed to execute the commands in profile 62 immediately or soon after log on. It is standard procedure for the UNIX operating system to execute all commands in a specified profile after log on. Other types of operating systems may need to include instructions to execute all the commands in specified profiles upon log on. Because profile 62 includes a command to execute tool 60, tool 60 will be executed immediately or soon after a systems administrator or other user logs on to system 10. Preferably, tool 60 executes within five seconds (and less preferably within ten seconds) after log on. By way of example, program tool 60 is a shell script (i.e. an executable file that contains shell commands that could otherwise be run manually from a command line). As explained in more detail below, after tool 60 is executed (after log on to system 10), tool 60 will display a final report indicating various conditions of system 10. This systems information will facilitate the tasks ordinarily performed by or often required of the systems administrator, such as application configuration and maintenance, connectivity troubleshooting, and application instance troubleshooting. When the systems administrator logs on to another system (in another session to manage or otherwise access this other system), the operating system of this other system automatically invokes a similar program tool to gather and present the system information for this other system in the other session. The foregoing process is repeated for each system to which the systems administrator logs on.

Thus, FIG. 1 also illustrates multiple, other systems 10a, b . . . n which are similar to system 10 and include similar components denoted by the same reference number and a suffix "a", "b" or "n" respectively. Thus, systems 10a,b . . . n are illustrated as containing the same application 20a, b . . . n as application 20 in system 10 but this is just for convenience of explanation. Systems 10a,b . . . n can contain different applications with different numbers of instances than in system 10. Also, there can be different or no message brokers in the systems 10a,b . . . n. Also, the operating system can be different in each of the systems. FIG. 1 also illustrates a multi-system management console 30 (including a display 32), shared by all systems 10, 10a,b . . . n. A systems administrator uses management console 30 to log on and otherwise control all systems 10, 10a,b . . . n, and review final reports generated by tools 60 and 60a,b . . . n for each system. When the systems administrator, using console 30, logs on to each system 10 and 10a,b . . . n in their respective sessions, tools 60 and 60a,b . . . n will automatically execute immediately or soon after log on to the respective system and generate and display the same type of final report in the respective session.

At any time after log on and display of the initial final report, the systems administrator can manually initiate invocation of the tool 60 or 60a,b . . . n by entering the appropriate command. In such a case, tool 60 or 60a, b . . . n will execute again and get updated information for the final report.

Figure 2:
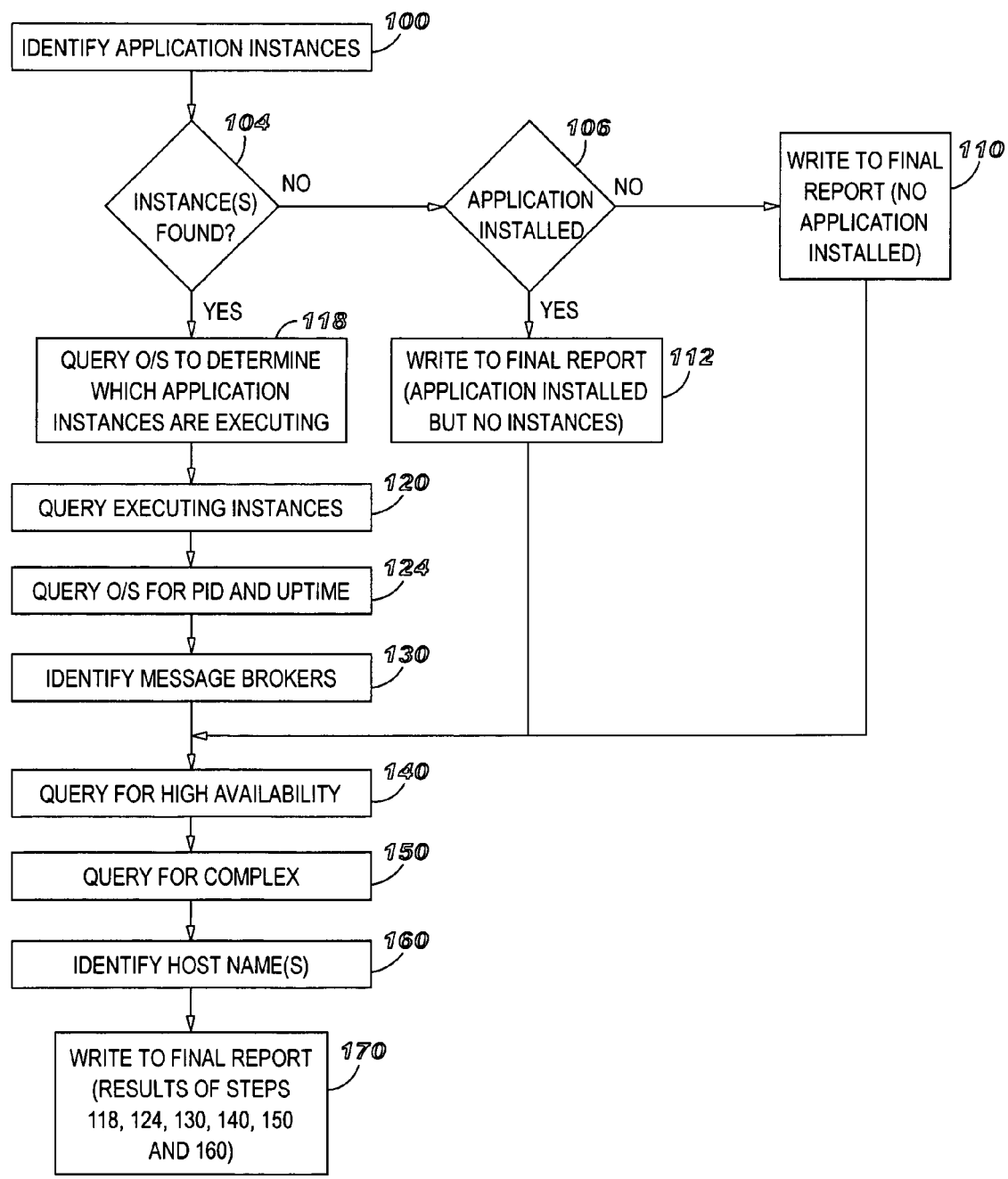
FIG. 2 is a flow chart illustrating a systems administration information gathering tool according to one embodiment of the present invention, which tool is installed in each of the computer systems of FIG. 1.

FIG. 2 illustrates subsequent operation of tool 60 in automatically determining selected system information for the systems administrator. (The steps of FIG. 2 are likewise performed by tools 60a,b . . . n in respective sessions for respective systems 10a,b . . . n when the systems administrator logs on to systems 10a,b . . . n.) In step 100, tool 60 identifies from the application master configuration file 26 all the instances 21, 22 and 23 of application 20 that are currently installed. If no instances are currently installed (decision 104, no branch), then, tool 60 queries operating system 14 if application 20 is currently installed (decision 106). In the UNIX operating system, this query can be made with a "Package Installation" query. If application 20 is not currently installed, then tool 60 records a message in a final report file 35 that application 20 is not currently installed (step 110). Referring again to decision 106, if application 20 is currently installed, then tool 60 records a message in the final report file 35 that no instances of application 20 are currently installed (step 112).

Referring again to decision 104, assuming there is at least one instance of application 20 currently installed, then tool 60 queries the operating system to determine which of these instances are currently executing (step 118). Then, tool 60 queries each of the executing application instances, such as with an application "ping" query (for example, using a "runmqsc" command when querying WebSphere MQ instances), to determine if the application instance is responsive (step 120). (The nature of the query is not important; it is only intended to determine if the application instance is responsive.) Tool 60 also queries the operating system to learn the process ID ("PID") and how long each application instance has been running ("uptime") (step 124). Next, tool 60 checks if any message brokers 40 are installed (step 130). In the illustrated embodiment, the message brokers, if they are installed, are installed at a predetermined location known to tool 60, so tool 60 can simply check this location for the presence of the message broker files. In other embodiments, a query can be made to the operating system for the names of any message brokers. Next, tool 60 queries the operating system whether system 10 is configured for high-availability, and if so, whether each application instance is configured for high availability (step 140). The operating system knows whether the system 10 is configured for high availability by checking for the existence of program files that implement high availability. "High availability" means that two or more systems are available to perform the same jobs, either in a cluster configuration or a primary/backup configuration. This information is important to a systems administrator so the systems administrator knows to change all the systems in the cluster or both the primary and backup system the same way. Next, tool 60 queries the operating system to learn if the system is part of a managed complex of integrated systems (for example, a "Super Parallel" configuration in IBM RS/6000 SP systems, running Parallel System Support Programs (PSSP) software). If so, tool 60 queries the operating system for the name of the controller workstation for the complex for which system 10 is a member (step 150). Next, tool 60 identifies the host name(s) of system 10 (step 160). There will likely be only one host name if system 10 works as a standalone system, and additional hostnames (aliases) if the system is a member of a complex. The information about the high availability and complex membership is important so the systems administrator will know which systems will be impacted by a change to a single, shared resource, and which systems should be configured and updated identically. Additionally, in a complex, some resources are automatically shared across multiple systems (such as user accounts and passwords, which can cause confusion to administrators if not properly documented). Finally, tool 60 compiles the information collected in steps 100-160 into a final report file, one report file per system (step 170). Preferably, each final report can be displayed on one screen. The final report file for each system will be displayed to the systems administrator automatically after log on for the system (step 170).

Figure 3:
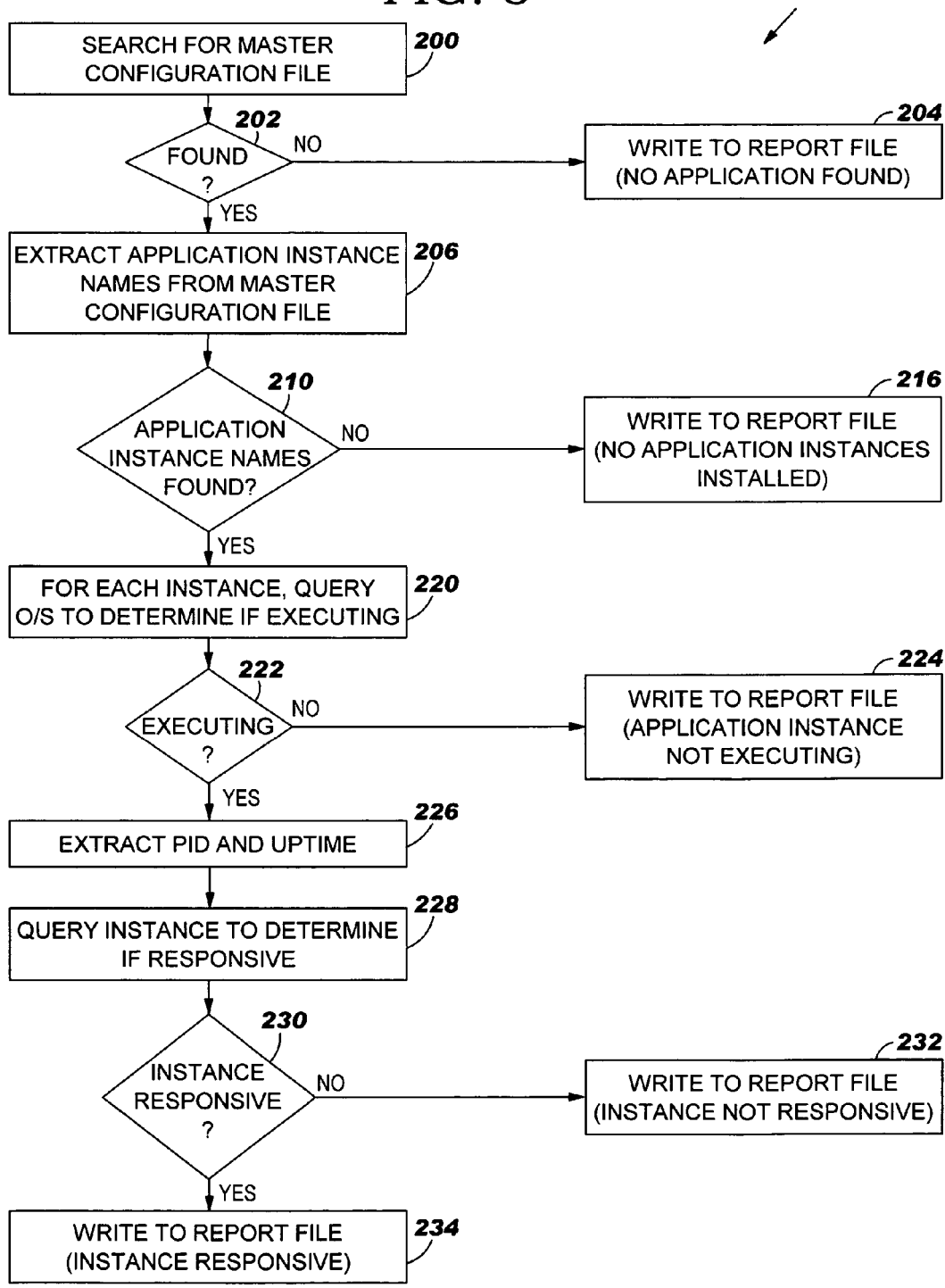
FIG. 3 is a flow chart illustrating in more detail an application instance identification function within the tool of FIG. 2.

FIG. 3 illustrates in more detail, steps 100-118 of FIG. 2, i.e. identifying the installed and the executing instances of application 20. In step 200, tool 60 searches for the application master configuration file 26. If file 26 cannot be found (decision 202), tool 60 records a message in the final report file that the application 20 is not installed (step 204). However, if tool 60 finds file 26, then tool 60 attempts to read from file 26 the names of all instances of application 20 that are currently installed in system 10, whether or not they are currently executing (step 206). If file 26 does not include any names of the application 20 instances (decision 210), then tool 60 records a message in the final report file 35 that no instances of application 20 are installed (decision 216).

Referring again to decision 210, assuming name(s) of application 20 instance(s) have been found in file 26, for each instance, tool 60 queries operating system 14 to determine whether the instance is currently executing (step 220 and decision 222). The operating system knows if the instance is currently executing because the operating system is responsible for dispatching the instances of application 20, and maintains a list of the executing instances. If the subject instance is not currently executing, tool 60 records this information in the final report file (step 224). Referring again to decision 222, if the subject application instance is currently executing, then tool 60 queries the operating system for the uptime and PID for this instance (step 226). Then, tool 60 queries each of the running application 20 instances to determine if the application instance is responsive (step 228). The outcome of this responsiveness test (decision 230) is also recorded in the final report file (step 232 or step 234).

Figure 4:
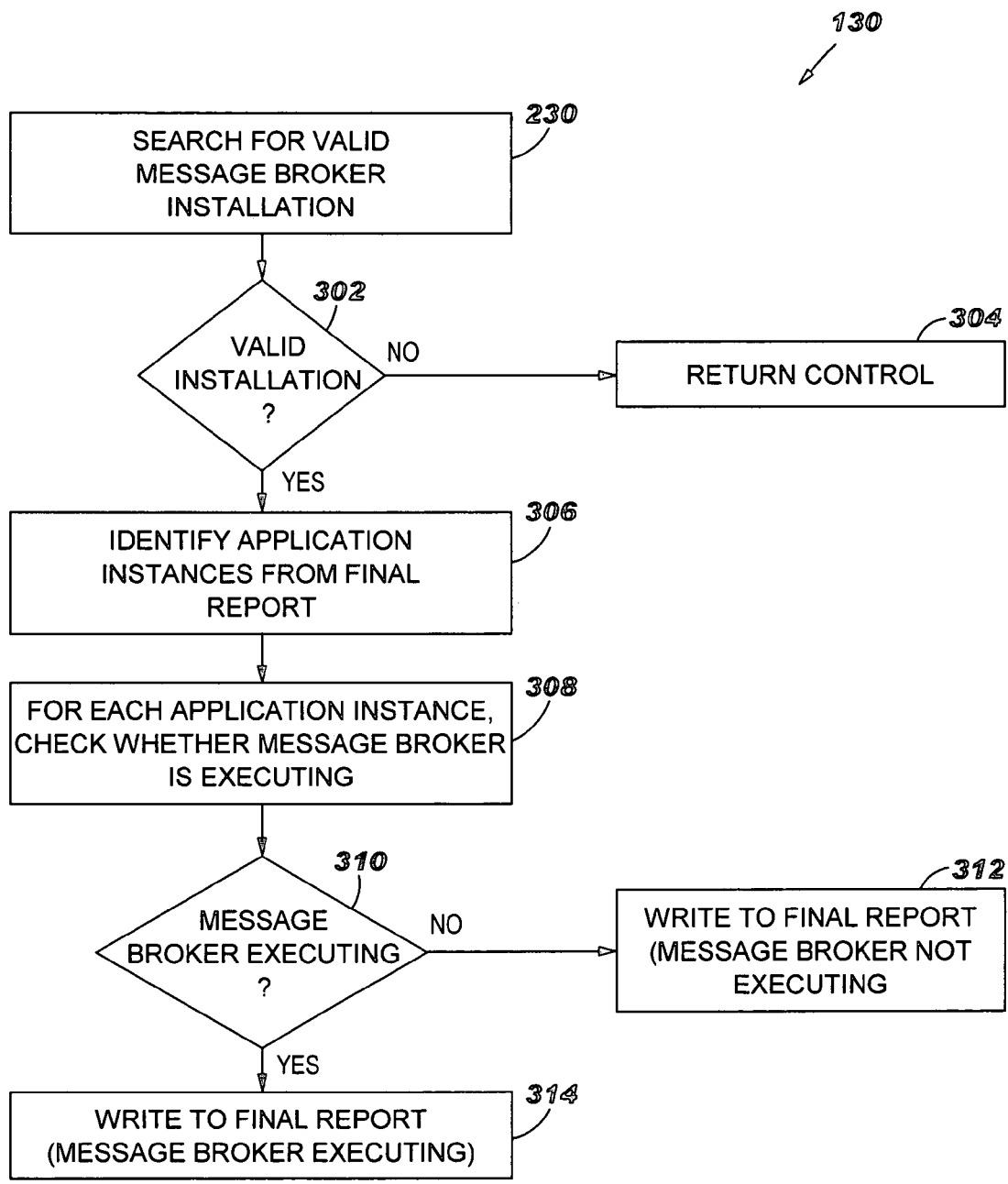
FIG. 4 is a flow chart illustrating in more detail a message broker idenfication function within the tool of FIG. 2.

FIG. 4 illustrates in more detail, step 130 of FIG. 2, i.e. identifying the message brokers 40. In step 300, tool 60 searches for a collection of files that define the message brokers for the system. In the illustrated example, if the message broker files exist, they are stored at a predetermined location known to tool 60. These files contain the executable code of the message brokers. These files also contain executable code which determines or a field which indicates the current status of each message broker. If the files are not found (decision 302), no further action is taken and control is returned from this function (step 304). However, if the message broker files are found, i.e. there is a valid message broker installation (decision 302), tool 60 reads from memory the application instances identified in step 118 (step 306). Then, for each running application instance, tool 60 checks if the respective message broker is currently executing (step 308 and decision 310). This check can be made either of two ways—querying the operating system for the process name of each message broker or checking the message broker file which indicates the status of the message broker. If the message broker is not currently executing, this is recorded in the final report file 35 (step 312). However, if the message broker is currently executing, this is instead recorded in the final report file (step 314).

Figure 5:
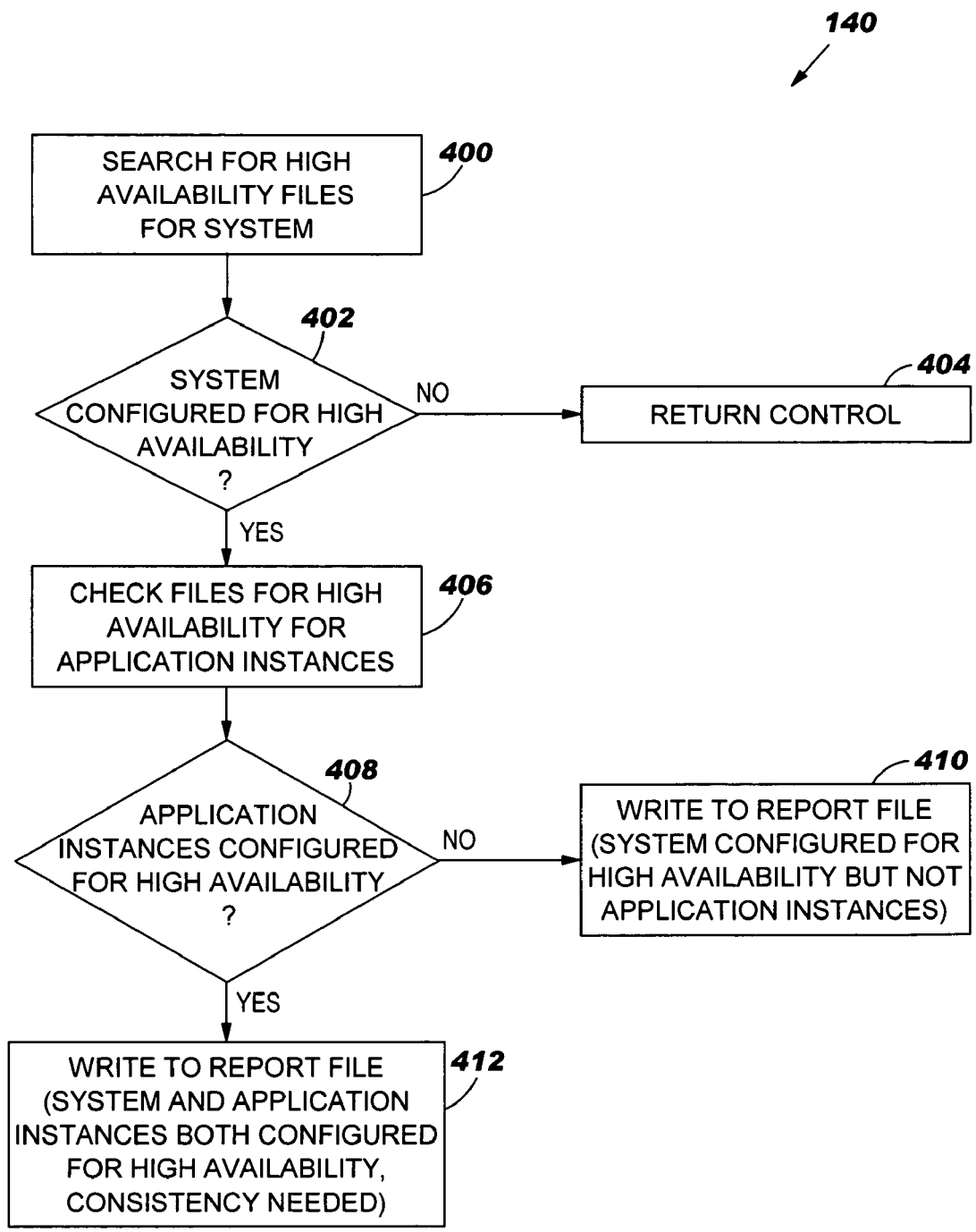
FIG. 5 is a flow chart illustrating in more detail a system and application high-availability determining function within the tool of FIG. 2.

FIG. 5 illustrates in more detail, step 140 of FIG. 2, i.e. querying for high availability of system 10 and the application 20 instances. In step 400, tool 60 searches operating system configuration file 50 to determine if system 10 is configured for high availability, i.e. configured as part of a cluster of systems or with another system in a primary/backup relationship. If not, then tool 60 takes no further action and function 140 returns control (decision 402 and step 404). However, if system 10 is configured for high availability, then tool 60 reads the names of application 20 instances from the application master configuration file 26. Then, tool 60 reads the application master configuration file 26 to determine if each of the application 20 instances is configured for high availability (decision 402 and step 406). (This means that there is another instance of this application on another system which is available to perform the same jobs as this instance either in a cluster configuration or a primary/backup configuration, and both of the application instances share a common repository for data needed by and/or generated by each application instance.) If the application instance is not configured for high availability, then tool 60 records in the final report file that the system 10 is configured for high availability, but the subject application 20 instance is not configured for high availability (decision 408 and step 410). Referring again to decision 408, if the application 20 instance is configured for high availability as indicated by file 26, then tool 60 records in the final report file that the system is configured for high availability and the application instance is also configured for high availability (step 412). This type of configuration may require extra steps by the systems administrator to make consistent changes in all the related systems (i.e. all the systems in the same cluster or both the primary and backup systems), when the changes are not automatically made by the system where the change is originally made, to all the related systems. For example, the systems administrator may be required to install, in all related systems, certain cron files (i.e. scheduler utilities) and certain "exits" (i.e. user written programs, usually for security purposes) which are not automatically installed by the system where these changes were originally installed (step 412).

Figure 6:
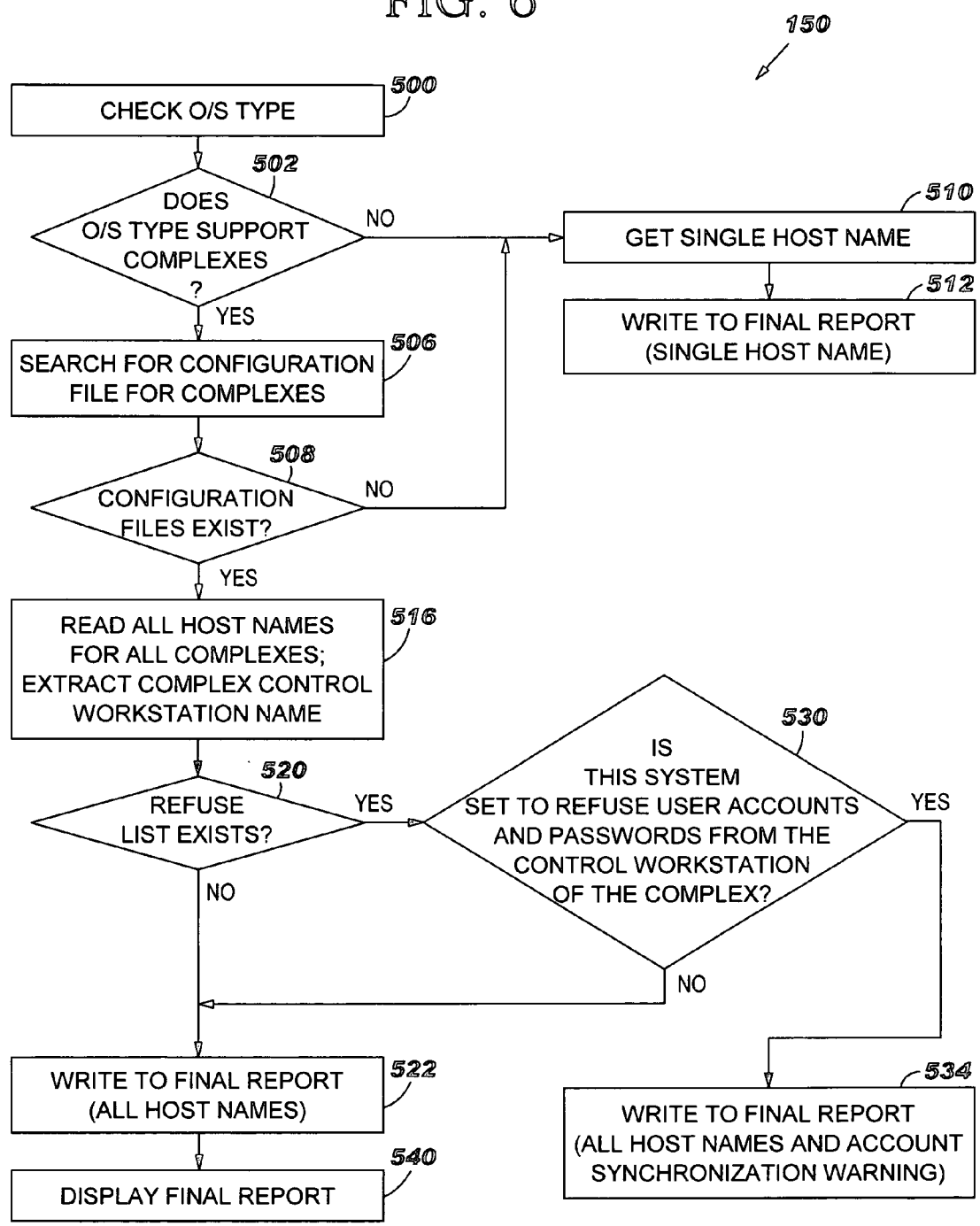
FIG. 6 is a flow chart illustrating in more detail a parallel configuration determining function within the tool of FIG. 2.

FIG. 6 illustrates in more detail, step 150 of FIG. 2, i.e. querying for the existence of a complex/cluster in which system 10 is a member. In step 500, tool 60 determines the type of operating system in system 10, for example, IBM AIX, Sun Solaris, or Linux This determination can be made by querying the operating system. Next, tool 60 determines from a table (not shown) or from knowledge of the capabilities of each operating system, if this type of operating system supports participation of system 10 in a complex (decision 502). If not, tool 60 queries the operating system for the system name of system 10 or accesses an operating system file to learn the system name of system 10 (step 510). Then, tool 60 records this information in the final report file (step 512). Referring again to decision 502, if the operating system can support participation of system 10 in a parallel computing complex (such as an IBM "Super Parallel" configuration), then tool 60 searches for a "complex" configuration file 28 associated with the operating system (step 506). This configuration file indicates the name of the master system (control workstation or CWS) in the complex. Tool 60 then searches the "complex" configuration file 28 for a "refuse" list. The refuse list indicates system configuration items (for example, user names and passwords from users at other systems) that should not be propagated from the control workstation to this system, i.e. system 10 will "refuse" these items if sent from the master system. If no complex is found (decision 508, no branch), then tool 60 obtains the single host name for system 10, as explained above (step 510), and then records this name in the final report file (step 512). Referring again to decision 508, if a configuration file 28 exists for the complex configuration, tool 60 then extracts all network adapter addresses (such as an IP address) for the system (via an operating system command) and queries a "host" file to extract all hostnames (aliases) by which this node may be known. (System 10 may be known by different names when it is installed into a complex) Then, tool 26 searches for the "refuse" file, (decision 520). Referring to decision 520, if no "refuse" file exists, tool 60 records in the final report file that the system is part of a complex, all names of this system 10, and the cautionary note that the the system has shared resources (ex. user home directories and user accounts/passwords); changes made to shared resources on one system will automatically affect all systems in the complex (step 522). Referring again to decision 520, if a refuse list exists, tool 60 checks if the refuse list is set to refuse the user IDs and passwords from the other systems in the complex (decision 530). If so, tool 60 records in the final report file that any user IDs and passwords that system 10 may have are localized and are not synchronized from the control workstation; therefore, user lists from the rest of the complex may not necessarily be present on this system 10 (step 534). Referring again to decision 530, if there is a refuse list, but it does not indicate refusal of user IDs and passwords from other systems in the complex, then tool 26 proceeds to step 522 as described above. If a complex is found, the name of the control workstation is also written to the final report. After steps 534 or 512, as the case may be, tool 60 displays the final report file 35 on screen 30 in the current session for the system currently being analyzed by tool 60. FIG. 7 illustrates an example of such a display screen.

Based on the foregoing, a systems administration information-gathering tool according to one embodiment of the present invention has been disclosed. However, numerous modifications and substitutions can be made without deviating from the scope of the present invention. For example, other types of systems information can be gathered by the tool 60 by addition of a corresponding information gathering program function into tool 60 (ie: to gather information about multiple applications and their instances). Therefore, the invention has been disclosed by way of illustration and not limitation, and reference should be made to the following claims to determine the scope of the present invention.

The invention claimed is:

1. A method for gathering information about a system, said method comprising the steps of:
   a user logging on to said system, and in response, computer programming automatically performing the following steps:

identifying application instances executing in said system;

determining whether said system is configured for high availability;

determining whether each of the identified application instances is configured for high availability;

determining if said system is a node of a cluster of systems; and compiling and displaying a unified report of information resulting from the foregoing steps.

2. A method as set forth in claim 1 wherein said programming automatically performs said steps within ten seconds of said user logging on.

3. A method as set forth in claim 1 wherein said computer program automatically performing the following additional step in response to the step of logging on:

identifying message brokers in said system; and wherein said report includes information resulting from the message broker identifying step.

4. A method as set forth in claim 1 wherein when said system and an application instance are both configured for high availability, said report includes advice that related systems need similar updates.

5. A method as set forth in claim 4 wherein when said system and an application instance are both configured for high availability, said report includes advice that related systems need similar scheduler utilities or exits.

6. A method as set forth in claim 1 wherein the step of determining if said system is a node of cluster of systems comprises the steps of:

determining if an operating system in said system is a type which supports said system being a node in a cluster of systems, and if so, searching for a configuration file, associated with said operating system, indicating whether said system is a node of a cluster of systems; and if said configuration file is found, determining different names of said system in said cluster of systems indicated by said configuration file, and if said configuration file is not found, determining a single name of said system.

7. A method as set forth in claim 1 wherein said computer programming executes in said system, and is automatically invoked by an operating system within said system after said user logs on to said system.

8. A computer program product for gathering information about a system, said computer program product comprising:

a computer readable medium;

first program instructions to identify application instances executing in said system;

second program instructions to determine whether said system is configured for high availability;

third program instructions to determine whether each of the identified application instances is configured for high availability;

fourth program instructions to determine if said system is a node of a cluster of systems; and fifth program instructions to compile and display a unified report of information resulting from the foregoing steps; and wherein said first, second, third, fourth and fifth program instructions are automatically invoked in response to a user logging on to said system and are recorded on said medium.

9. A computer program product as set forth in claim 8 wherein said first, second, third, fourth and fifth program instructions are automatically executed within ten seconds of said user loggin on.

10. A method for gathering information about first and second systems operated from a common management console, said method comprising the steps of:

a user logging on to said first system in a first session, and in response, first computer programming automatically performing the following steps:

identifying application instances executing in said first system;

determining whether said first system is configured for high availability;

determining whether each of the identified application instances in said first system is configured for high availability;

determining if said first system is a node of a cluster of systems;

compiling and displaying a first, unified report of information resulting from the foregoing steps performed for said first system; and said user logging on to said second system in a second session, and in response, second computer programming automatically performing the following steps:

identifying application instances executing in said second system;

determining whether said second system is configured for high availability;

determining whether each of the identified application instances in said second system is configured for high availability;

determining if said second system is a node of a cluster of systems; and compiling and displaying a second, unified report of information resulting from the foregoing steps performed for said second system.

11. A method as set forth in claim 10 wherein:

said first computer programming executes in said first system, and is automatically invoked by a first operating system within said first system after said user logs on to said first system; and said second computer programming executes in said second system, and is automatically invoked by a second operating system within said second system after said user logs on to said second system.

* * * * *